(12) United States Patent
Noessing et al.

(10) Patent No.: US 7,010,120 B2
(45) Date of Patent: Mar. 7, 2006

(54) METHOD FOR ADJUSTING A RINGING SIGNAL CURRENT IN A SUBSCRIBER LINE AND CIRCUIT ARRANGEMENT

(75) Inventors: Gerhard Noessing, Villach (AT); Herbert Zojer, Villach (AT)

(73) Assignee: Infineon Technologies AG, Munich (DE)

( * ) Notice: Subject to any disclaimer, the term of this patent is extended or adjusted under 35 U.S.C. 154(b) by 23 days.

(21) Appl. No.: 10/646,662

(22) Filed: Aug. 22, 2003

(65) Prior Publication Data

US 2004/0071282 A1    Apr. 15, 2004

(30) Foreign Application Priority Data

Aug. 30, 2002 (DE) ................................ 102 40 815

(51) Int. Cl.
*H04M 19/02* (2006.01)
(52) U.S. Cl. .................................. 379/413.01; 379/252
(58) Field of Classification Search ........... 379/413.01, 379/251, 252
See application file for complete search history.

(56) References Cited

U.S. PATENT DOCUMENTS 5,260,996 A * 11/1993 Dillon et al. ................ 379/252
6,813,340 B1 * 11/2004 Issaa et al. .............. 379/399.01

FOREIGN PATENT DOCUMENTS

| DE | 44 06 500 A1 | 8/1995 |
|---|---|---|
| GB | 2 113 044 A | 7/1983 |
| WO | 99/27703 | 6/1999 |
| WO | 02/073936 A2 | 6/2002 |

* cited by examiner

*Primary Examiner*—Daniel Swerdlow
(74) *Attorney, Agent, or Firm*—Jenkins, Wilson & Taylor, P.A.

(57) ABSTRACT

The invention creates a method for adjusting a ringing signal current in a subscriber line (106), a ringing signal generator (114) which generates the ringing signal being connected with one end of the subscriber line (106) and at least one subscriber (102) being connected to another end of the subscriber line (106), comprising the steps of detecting a ringing signal current of the ringing signal; of comparing the detected ringing signal current with a predetermined current value; and when the detected ringing signal current is greater than the predetermined current value, reducing a ringing signal voltage of the ringing signal in such a manner that the ringing signal current is equal to the predetermined current value, the ringing signal voltage being dropped across the subscriber line (106) and a load of at least one subscriber (102). The invention also creates a circuit arrangement for carrying out the method.

3 Claims, 2 Drawing Sheets

METHOD FOR ADJUSTING A RINGING SIGNAL CURRENT IN A SUBSCRIBER LINE AND CIRCUIT ARRANGEMENT

TECHNICAL FIELD

The present invention relates to a method for adjusting a ringing signal current in a subscriber line and to a circuit arrangement for carrying out the method.

BACKGROUND ART

A telephone system generally has a telephone central office or an exchange, and one or more subscriber telephone sets which are in each case connected to the telephone central office via a subscriber line. The subscriber telephone sets can be telephones or any other telephone equipment. The subscriber line generally has two conductors or two wires which are called "tip" and "ring". The tip wire and the ring wire transport both alternating current signals and direct current signals. The subscriber telephone set, together with the associated tip and ring wires, is generally called a loop or subscriber loop (SL).

The telephone central office handles the switching of telephone signals between subscriber telephone sets. Industry standards such as, e.g. the Telcordia (Bellcore) Technical Reference TR-NWT-00057, Functional Criteria for Digital Loop Carrier (DLC) Systems, Issue Jan. 2, 1993, determine the electrical signal levels which are used for switching, connecting and signaling within the telephone system. If, for example, a telephone call to a particular subscriber telephone set is registered, the telephone central office must send signals to the telephone set in order to signal the incoming call. For this purpose, the telephone central office, using a ringing signal generator, sends out ringing signals which have the effect that the subscriber telephone set generates a bell signal. The bell signal can be a ringing bell, an electronic tone or any other audible or visible bell signal. The ringing signals are applied directly to the subscriber line by the telephone central office.

In the telephone central office of the telephone system, a line card, the ringing signal generator and a voltage supply for the line card and the ringing signal generator are usually arranged. The line card supplies a number of subscribers and is usually installed in a rack in the telephone central office. The line card has a subscriber line interface circuit (SLIC) for each subscriber, as an alternative, can also have an internal ringing signal generator for each subscriber, instead of an external ringing signal generator.

The subscriber line interface circuit is coupled to a respective subscriber line via associated connections and is connected to the subscriber via the subscriber line. As an alternative, the subscriber line interface circuit can also be located outside of and remote from the telephone central office in a private automatic branch exchange (PABX). The subscriber line interface circuit couples the analog subscriber line operated at a high voltage to the analog and digital circuits in the telephone central office, which are operated at low voltages. The subscriber line interface circuit usually supports the familiar "BORSHT" functions of battery feed, of overvoltage protection, of ringing signal generation, of signaling, of coding or PCM conversion, of the conversion between a two-wire transmission and a four-wire transmission (hybrid) and of the testing.

The subscriber loop consisting of the subscriber line and the subscriber telephone set has a loop resistance. The loop resistance (RL) is composed of a line resistance of the subscriber line and the load resistance of the subscribers connected to the subscriber line. The line resistance of the subscriber line depends on the length of the subscriber line or the distance between the telephone central office and the subscriber telephone set, and the load resistance depends on the number of subscriber telephone sets connected to the subscriber line (REN—Ringer Equivalent Number). If, in the case of a short subscriber line, the subscriber telephone set is physically close, e.g. only a few blocks of houses away from the telephone central office, the line resistance has a value of about 0 ohms ($\Omega$). If, in the case of a long subscriber line, the subscriber telephone set is far distant, e.g. several kilometers, from the telephone central office and the subscriber line interface circuit, the line resistance is up to 930 ohms. With regard to the load connected to the subscriber line, the resistance or impedance occurring between the terminals of a subscriber telephone set should be about 1 REN in the on-hook state, in correspondence with industry standards, 1 REN corresponding to an impedance of 7 000 ohms at 20 Hz. Furthermore, it must be possible to operate the telephone system with up to five subscriber telephone sets (5 REN) or an impedance of 1 400 ohms at 20 Hz.

A ringing signal generator or a subscriber line interface circuit which has a ringing signal generator must be capable of supplying ringing signals to differently loaded subscriber lines which have an arbitrary length such as, e.g. a short length with low impedance or a long length with high impedance. In correspondence with the abovementioned Telcordia industry standard, the ringing signal must be applied to the subscriber line as an alternating voltage with a direct-voltage component. The direct-voltage component is preferably 49 volts, measured in the telephone central office. With regard to the alternating voltage, at least 40 V (rms) must be present across the maximum permissible load of 5 REN. In this case, a ringing signal current of about 29 mA flows. If the subscriber line is long, the maximum resistance of the subscriber line is 930 ohms according to the abovementioned standard and the telephone central office or, respectively, the ringing signal generator must then supply an alternating voltage of about 85 V (rms) at 20 Hz. If, however, the subscribers or, respectively, the load are connected directly to the telephone central office, no alternating voltage of 85 V (rms) but only of 43 V (rms) is required. If, however, the ringing signal generator feeds the subscriber line with an alternating voltage of 85 V (rms), this corresponds to a ringing signal current of 55 mA. This is a current which is greater by about 60% than the current which is actually needed for a load of 5 REN.

As an example, external ringing signal generators are frequently used in the US which are connected to the subscriber line via relays. In this arrangement, only one ringing signal generator is usually used for a number of subscriber lines. In the case of conventional solutions with an external ringing signal generator, however, power losses of the order of magnitude of up to 4 watts occur. Since network terminations (NT) in ISDN (Integrated Services Digital Network) or DLC (Digital Loop Carrier) systems are frequently remotely fed and must continue to maintain the telephone service during a mains voltage failure (lifeline support), the telephone service cannot be maintained by battery for any length of time in the case of a mains voltage failure with the usual external ringing signal generators.

However, to provide for as long as possible an operation of network terminations in the case of a mains voltage failure, resistances are connected into the feed line within the ringing signal generator which limit the current in the case of conventional ringing signal generators. By this means, a steep rise in the ringing signal current which is caused by a small loop resistance in connection with a constant high ringing signal voltage is prevented for example in the case of a short subscriber line and the ringing signal current is kept as low as possible for these short subscriber lines which can even represent a short circuit. A disadvantage of such ringing signal generators consists in that in order to supply a ringing signal voltage of 43 V (rms) even when a full load (5 REN) is connected to the subscriber line, the open-circuit voltage must be increased which, in turn, produces an increase in the power loss.

To solve the problem of increased open-circuit voltage, a host controller of a line card is normally used which periodically measures a line current in the subscriber line and determines from this whether the subscriber line is long or short. The host controller then programs the ringing signal generator in such a manner that the power loss is reduced.

A disadvantage of line cards which measure the line current in order to reduce the power loss consists in that it is not possible to control the power loss of the ringing signal generator accurately by means of the line current and, therefore, the power loss cannot be optimally reduced.

The conventional line cards which have ringing signal generators and subscriber line interface circuits have a voltage supply which usually supplies a voltage of the order of magnitude of 150 V to the line card with the technology used here. The voltage is designed for the worst case of loading on a ringing signal generator during the generation of a ringing signal as a result of which a line card has a high power loss in cases with less loading on the ringing signal generator, e.g. in the case of short subscriber lines and few subscriber telephone sets connected to the subscriber line.

Therefore, a further disadvantage of conventional line cards and ringing signal generators consists in that the power loss of a line card cannot be optimally controlled and reduced even with regard to the supply voltage of the line card.

SUMMARY OF THE INVENTION

The object of the present invention consists in creating a method for adjusting a ringing signal current in a subscriber line and a circuit arrangement which provides for optimum reduction in the power loss of a ringing signal generator and of a line card.

This object is achieved by a method for adjusting a ringing signal current in a subscriber line as described herein.

The basic concept of the invention consists in detecting the ringing signal current instead of the line current in the subscriber line and adjusting a ringing signal voltage by means of the detected ringing signal current, in such a manner that the ringing signal current which is generated by the ringing signal voltage dropped across the subscriber line and the connected load is kept at or in the vicinity of a particular minimum or optimum current value.

The invention relates to a method for adjusting a ringing signal current in a subscriber line, a ringing signal generator which generates the ringing signal being connected to one end of the subscriber line and at least one subscriber being connected to another end of the subscriber line, comprising the steps of detecting a ringing signal current of the ringing signal, comparing the detected ringing signal current with a predetermined current value and, when the detected ringing signal current is greater than the predetermined current value, reducing a ringing signal voltage of the ringing signal in such a manner that the ringing signal current is equal to the predetermined current value, the ringing signal voltage being dropped across the subscriber line and a load of the at least one subscriber.

According to a preferred development of the method, the step of comparing also exhibits the steps of comparing the detected ringing signal current with stored current values which are associated with stored voltage values of the ringing signal voltage, and setting the ringing signal voltage in accordance with the stored voltage values, in such a manner that the ringing signal current is equal to the predetermined current value.

According to a further preferred development of the method, the step of comparing the detected ringing signal current with a predetermined current value is carried out periodically or once per ringing signal.

According to a further preferred development of the method, the method also exhibits the step of setting a supply voltage of the ringing signal generator in dependence on the ringing signal voltage.

The invention also relates to a circuit arrangement which is connected to one end of a subscriber line, at least one subscriber being connected to another end of the subscriber line, comprising a ringing signal generator which generates a ringing signal and is connected to the subscriber line, and a host controller which controls the ringing signal generator and carries out the method according to the invention.

According to a preferred development of the circuit arrangement, the circuit arrangement also exhibits a memory in which the current values, which are compared with the detected ringing signal current, and the associated voltage values for adjusting the ringing signal voltage, are stored.

According to a further preferred development of the circuit arrangement, the circuit arrangement also exhibits a DC/DC converter which is controlled by the host controller and which converts an external supply voltage into the supply voltage of the ringing signal generator in dependence on the ringing signal voltage.

According to a further preferred development of the circuit arrangement, the circuit arrangement also exhibits an interface circuit which is connected to the subscriber line and to the host controller and is controlled by the host controller in order to detect the ringing signal current of the ringing signal.

According to a further preferred development of the circuit arrangement, the interface circuit exhibits the ringing signal generator and the DC/DC converter sets a supply voltage of the interface circuit in dependence on the ringing signal voltage.

According to a further preferred development of the circuit arrangement, the circuit arrangement is a line card.

An advantage of the method according to the invention and of the circuit arrangement according to the invention consists in that by detecting the ringing signal current, the ringing signal current can be precisely adjusted via the ringing signal voltage and, as a result, the power loss caused by a ringing signal generator or by a line card including a ringing signal generator is optimally reduced.

A further advantage of the method according to the invention and of the circuit arrangement according to the invention consists in that by controlling the supply voltage of the line card in accordance with demand, the power loss of the line card is greatly reduced.

Exemplary embodiments of the present invention are explained in greater detail with reference to the attached drawing.

DETAILED DESCRIPTION OF THE INVENTION

Figure 1:
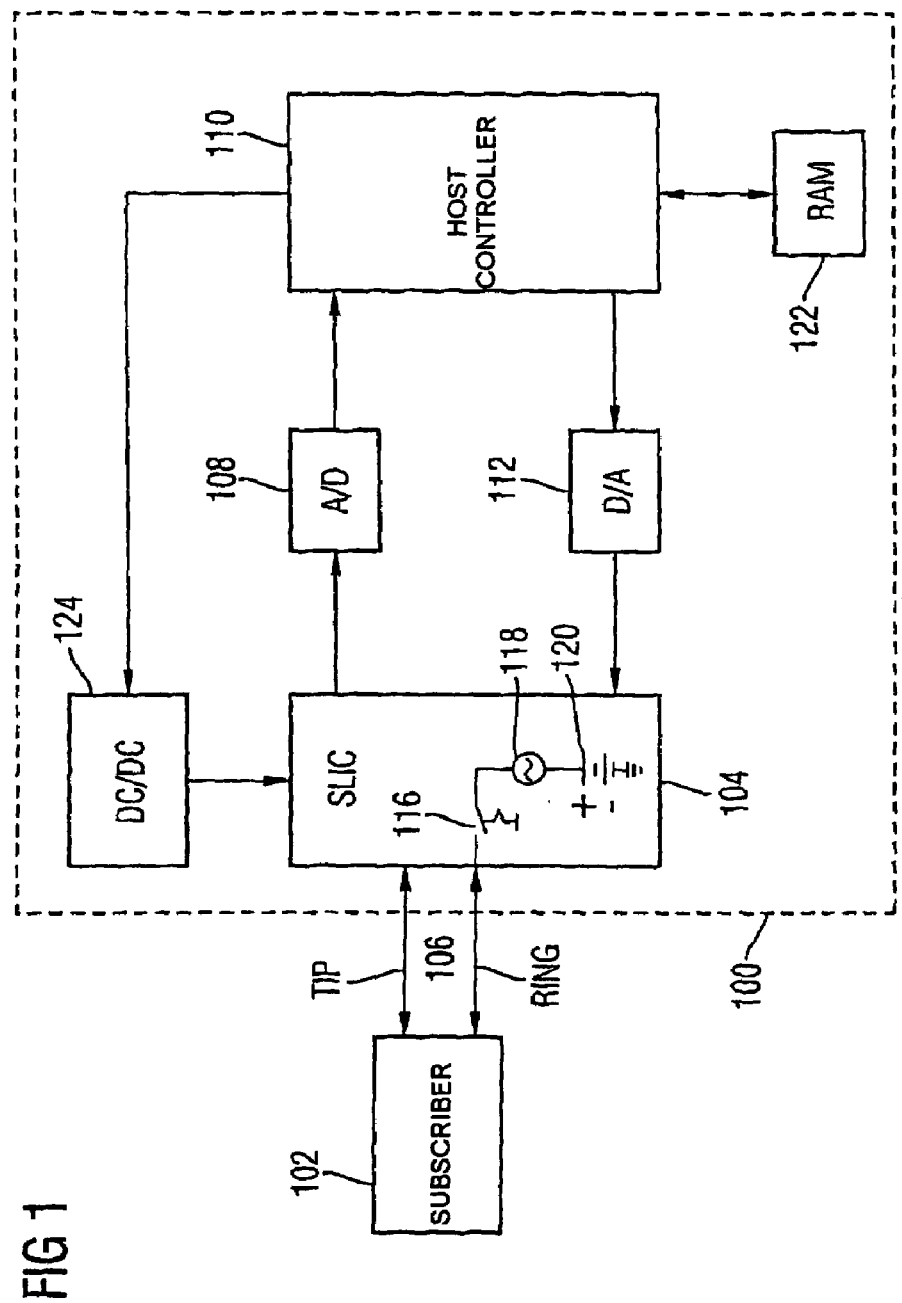
FIG. 1 shows exemplary embodiments of a line card according to the present invention.

Line cards 100 are usually arranged in racks in the telephone central office, a number of subscribers 102 being supplied by one line card. The line card 100 exhibits for each subscriber 102 one subscriber line interface circuit (SLIC) 104 which is connected to the subscriber 102 via a subscriber line 106. The subscriber line 106 exhibits a tip wire and a ring wire. The subscriber line interface circuit 104 couples the subscriber line 106, which is operated at a high voltage, to the analog and digital circuits in the line card 100 which are operated at lower voltages. The subscriber line interface circuit 104 usually supports the above-mentioned "BORSHT" functions of battery feed, over voltage protection, ringing signal generation, signaling, coding or PCM conversion, hybrid conversion and testing. The subscriber line interface circuit 104 is coupled via an analog/digital converter 108 to a host controller 110 in order to detect and evaluate voice signals and other information received via the subscriber line 106 such as, e.g. the measurement of currents in the tip wire or the ring wire of the subscriber line 106, an off-hook state or an on-hook state. The analog voice signals and the information signals associated with the information are converted by the analog/digital converter 108 into digital signals which are processed and evaluated by the host controller 110. In the opposite direction, the host controller 110 is coupled via a digital/analog converter 112 to the subscriber line interface circuit 104 in order to convert, for example, digital voice signals into analog voice signals and digital ringing signals into analog ringing signals for the respective subscriber line.

In the subscriber line interface circuit 104, the line card 100 preferably exhibits a ringing signal generator 114 which is arranged at the end of the subscriber line 106 opposite to the subscriber 102, where it can be selectively preferably connected to the subscriber line 106 via a switching device 116. The ringing signal generator 114 exhibits an alternating voltage source 118 and a direct voltage source 120. The ringing signal generator can be located outside or inside (as shown diagrammatically in FIG. 1) of the subscriber line interface circuit 104 within the line card 100 or can be arranged outside the line card 100.

In the present invention, the ringing signal current of the ringing signal which is generated by the ringing signal generator 114 and is transmitted via the subscriber line 106 to one or more subscribers 102 connected to the subscriber line is preferably detected by the subscriber line interface circuit 104. The detected ringing signal current is supplied via the analog/digital converter 108 to the host controller 110 which compares the detected ringing signal current with a predetermined current value. If the detected ringing signal current is greater than the predetermined current value, the host controller reduces the ringing signal voltage of the ringing signal generated across the subscriber line 106 by the ringing signal generator 114 in such a manner that the ringing signal current which is produced by the drop of the ringing signal voltage across the subscriber line 106 and the connected subscriber 102 or the connected subscribers is less than or equal to the predetermined current value.

The line card according to the invention also exhibits a memory 112 which is connected to the host controller 110 and in which current values and associated voltage values of the ringing signal are stored in order to set the ringing signal voltage in dependence on the ringing signal current detected by the subscriber line interface circuit 104 by means of the host controller 110, in such a manner that the ringing signal current in the subscriber line 106 is less than or equal to the predetermined current value. The memory 112 preferably exhibits a random access memory (RAM). The ringing signal voltage is preferably set via coefficients by means of which the ringing signal generator 114 is driven for setting the ringing signal voltage. The association of the stored current values with corresponding voltage values can depend, for example, on the number of subscribers 102 connected to the line 106 which is 5 (5 REN) at a maximum, and on the length of the subscriber line 106 which usually has a line resistance of 930 ohms in the case of a long subscriber line. The predetermined current value is 29 mA in this case. If fewer subscribers are connected to the subscriber line 106 so that the load on the subscriber line 106 drops and a lower current flows through the subscriber line 106, the ringing signal voltage must be increased so that it does not drop below the predetermined current value. When the subscriber line has a minimum length and the maximum number of possible subscribers (5 REN) is connected to the line, the ringing signal current flowing through the subscriber line is very great which makes it necessary to reduce the ringing signal voltage. The host controller 110 preferably controls the ringing signal generator 114 or the subscriber line interface circuit 104 containing the ringing signal generator 114, in such a manner that the current value of the ringing signal is detected either periodically or once per ringing signal and the ringing signal voltage is then set in dependence on this value.

In a further exemplary embodiment of the present invention, the line card 100 also has a DC/DC converter 124 which is connected to the host controller 110 and which controls the supply voltage of the subscriber line interface circuit 104 or, respectively, of the ringing signal generator 114 arranged therein or of the ringing signal generator arranged outside the subscriber line interface circuit 104. The DC/DC converter 116 itself is connected to a voltage supply of the line current 100 (not shown) in order to convert the supply voltage of the line card 100 into a suitable power loss-reducing supply voltage for the subscriber line interface circuit 104 and the ringing signal generator 114.

During the operation of the line card 100, the host controller 110 preferably controls the DC/DC converter 116 in such a manner that the supply voltage for the subscriber line interface circuit 104 or the ringing signal generator 114, respectively, is just sufficient for being able to transmit the ringing signal without distortion via the subscriber line 106. Such distortion preferably occurs at low amplitudes of the sinusoidal signals used for the PCM coding, the amplitudes being clipped by the distortion. The external supply voltage of the DC/DC converter 124 is usually 150 V whereas the supply voltage supplied to the subscriber line interface circuit 104 means of the by DC/DC converter 124, for example with a very short subscriber line, is then preferably only 65 V.

The DC/DC converter 124 is provided either once per line card 100 or, as an alternative, also once per subscriber line interface circuit 104 as a separate voltage control for each subscriber line interface circuit 104. The host controller 110 preferably controls a number of subscriber line interface circuits 104 and the DC/DC converter 124 associated with the respective subscriber line interface circuit 104.

Figure 2:
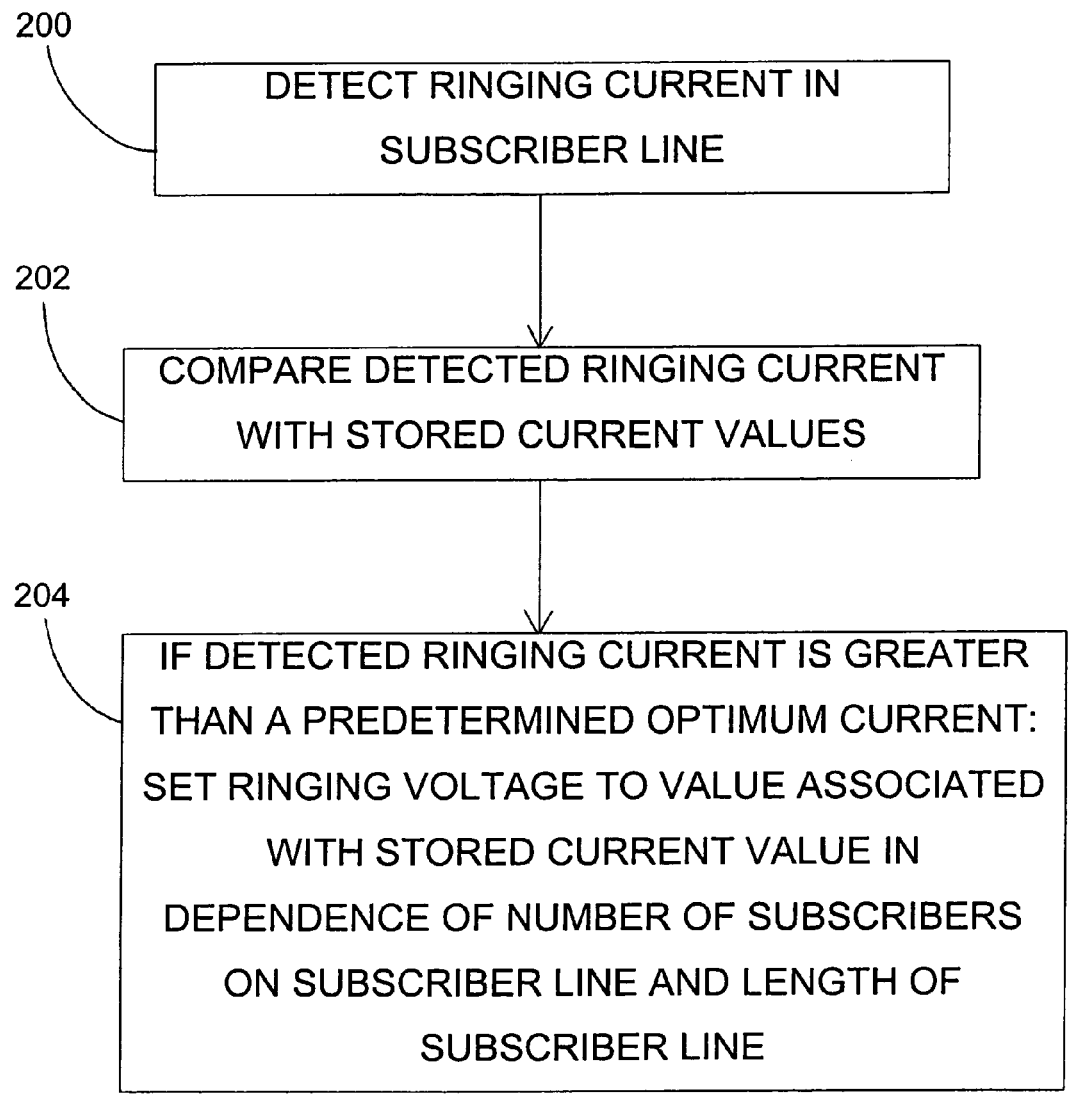
FIG. 2 shows exemplary method steps according to the present invention.

FIG. 2 Is a flow chart illustrating an exemplary process for adjusting a ringing signal current in a subscriber line with a controlled ringing signal generator according to an embodiment of the subject matter described herein. The ringing signal generatorcan be coupled to the subscriber line and generate a ringing signal voltage. The ringing signal current can be dropped across the subscriber line and a load of a subscriber coupled to the subscriber line. Initially, a ringing signal current flowing through to subscriber line may be detected (step 200). Next, the detected ringing signal current can be compared with stored current values (step 202). Each stored current value is associated with a stored voltage value in dependence of the number of subscribers coupled to the subscriber line and the length of the subscriber line in such a manner that, by adjusting a ringing signal voltage to a respective stored voltage value, the corresponding ringing signal current is equal to a predetermined optimum current value. Further, the ringing signal voltage may be set to a corresponding voltage value associated with the stored current value if the detected ringing signal current is greater than the predetermined optimum current value (step 204). Detection of the ringing signal current and adjustment of the ringing signal voltage may be carded out periodically or once per ringing signal.

An advantage of the present invention consists in that the power loss of a line card and of the associated overall system can be considerably reduced by means of the optimized adjustment of the ringing signal current and also by separately controlling the supply voltage for each subscriber line interface circuit or for each ringing signal generator, which, for example, makes it possible to maintain the telephone service for a longer period of time in the case of a mains voltage failure (lifeline support). In comparison with conventional line cards which have a power loss of up to 4 watts, the line card described herein provides for a reduction in the power loss of up to 1 watt and thus considerable cost savings, such as, e.g. for batteries which ensure that telephone service is maintained in the case of a mains voltage failure.

Another advantage of the present invention consists in that the invention can also be used in the case of chip sets which are not equipped with fully automatic control in that the host controller is programmed for limiting the ringing signal voltage in such a manner that the ringing signal current, for example, is no greater than 29 mA in this case.

The invention can be used, in particular, with the new GEMINAX (Global Enhanced Multiport Integrated ADSL transceiver) chip sets by Infineon for subscriber line interface circuits, analog/digital converters and digital/analog converters. In these chip sets, conventional host controllers such as, e.g. controllers by Motorola are normally used which, apart from the usual evaluation of the information by a subscriber line, e.g. on-hook and off-hook state, call distribution, call direction, relay states etc. also provides for the evaluation of the ringing signal and its relationship with respect to predetermined thresholds, such as, e.g. ringing signal current thresholds. Such an evaluation can be implemented by means of simple DSP (Digital Signal Processor) programming.

What is claimed is:

1. A method for adjusting a ringing signal current in a subscriber line with a controlled ringing signal generator, the ringing signal generator being coupled to the subscriber line and generating a ringing signal voltage, the ringing signal current being dropped across the subscriber line and a load of at least one subscriber coupled to the subscriber line, the method comprising:
   (a) detecting a ringing signal current flowing through the subscriber line;
   (b) comparing the detected ringing signal current with stored current values, wherein each stored current value is associated with a stored voltage value in dependence of the number of subscribers coupled to the subscriber line and the length of the subscriber line in such a manner that, by adjusting a ringing signal voltage to a respective stored voltage value, the corresponding ringing signal current is equal to a predetermined optimum current value;
   (c) setting the ringing signal voltage to a corresponding voltage value associated with the stored current value if the detected ringing signal current is greater than the predetermined optimum current value; and
   (d) wherein detecting the ringing signal current and adjusting the ringing signal voltage is carried out periodically or once per ringing signal.

2. The method as claimed in claim 1, comprising:
   (a) adjusting a supply voltage of the ringing signal generator in dependence on the ringing signal voltage.

3. The method as claimed in claim 2 wherein the supply voltage for the ringing signal generator is adjusted in such a manner that the supply voltage is just sufficient for being able to transmit the ringing signal without distortion via the subscriber line.

* * * * *